S. P. HARBISON.
MANUFACTURE OF FIRE-BRICK FOR CONVERTER BOTTOMS.
No. 177,118. Patented May 9, 1876.
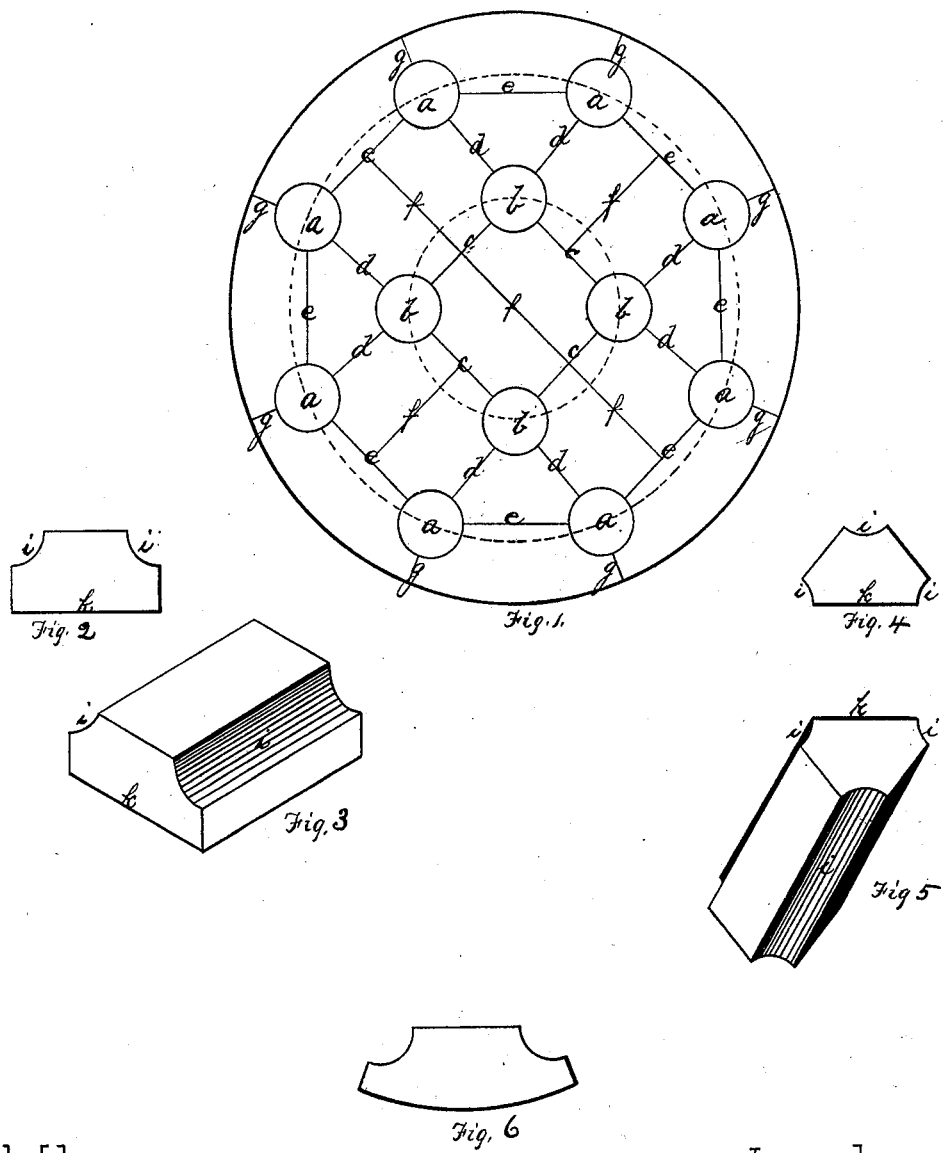

UNITED STATES PATENT OFFICE.

SAMUEL P. HARBISON, OF ALLEGHENY, ASSIGNOR TO HARBISON & WALKER, OF PITTSBURG, PENNSYLVANIA.

IMPROVEMENT IN THE MANUFACTURE OF FIRE-BRICKS FOR CONVERTER-BOTTOMS.

Specification forming part of Letters Patent No. 177,118, dated May 9, 1876; application filed April 3, 1876.

*To all whom it may concern:*

Be it known that I, SAMUEL P. HARBISON, of Allegheny, in the county of Allegheny and State of Pennsylvania, have invented a new and useful Improvement in Manufacture of Fire-Bricks for Converter-Bottoms; and I do hereby declare the following to be a full, clear, and exact description thereof, reference being had to the accompanying drawing, forming a part of this specification, in which—

Figure 1 is a diagram illustrating a converter-bottom from bricks embodying my invention. Fig. 2 is an end view, and Fig. 3 is a perspective view, of one form of brick. Fig. 4 is an end view, and Fig. 5 is a perspective view, of a second form of brick; and Fig. 6 is an end view of a third form of brick.

These three forms of bricks may be, and preferably are, used conjointly in forming a Bessemer-converter bottom, and are therefore herein shown for the sake of clearly describing the invention; but the principle involved and the subject-matter intended to be claimed are found only in the bricks Figs. 2, 3, 4, and 5.

My invention relates to the manufacture of fire-bricks for converter-bottoms and like purposes; and consists in forming the bricks with a series of grooves or curved faces, which bound the tuyeres, and a broad surface or side, upon which the brick may rest in drying without the bricks becoming distorted.

Two methods are at present employed in forming the bottoms of Bessemer and like converters, the first and usual method being to ram what is termed "ganister," in a plastic condition, around the tuyeres within the mold. The second is to form the bottom partly of bricks of ganister or fire-clay, so shaped that they can be set between and around the tuyeres, and then to fill in the spaces around the tuyeres with plastic ganister, in the usual manner. The latter method is, of course, preferable, on account of the time and labor saved; but from the shape heretofore given to the brick it has been impossible to set them so as to form close joints between the bricks and tuyeres, owing to the irregularity of the brick, due to its distortion in drying, and, as a consequence, large spaces between the tuyere and bricks have to be rammed in the usual manner. These bricks or blocks are necessarily formed with grooved or concaved portions, so that when the blocks are arranged within the mold or bottom a series of circular cavities are left for the tuyeres. As a consequence of this shape, when the brick is laid upon one face to dry, the overhanging portions will sag, and if stood upon end the weight of the damp material will cause the brick to spread, so that in either case the brick becomes distorted.

The object of the present invention is, therefore, to so form or shape the brick as to adapt it to the position it is to occupy, and at the same time give it a form which will permit its being removed from the mold and dried without distortion.

I will now proceed to describe my invention by reference to the drawing, so that others skilled in the art to which it appertains may apply the same.

In a converter-bottom the tuyeres are usually arranged equal distances apart, and in two concentric circles. In Fig. 1, *a a* represent the outer, and *b b* the inner, circle of tuyeres. By a series of lines, *c c*, *d d*, and *e e*, the space within the circle of the outer tuyeres is divided up into sections bounded by either three or four of the tuyeres. The lines *c c* are drawn from center to center of the four inner tuyeres, giving a brick having four equal sides, and grooves or concavities corresponding to the tuyeres. The lines *d d* are drawn from the center of one of the inner tuyeres to the centers of the two adjacent outer tuyeres, while the lines *e e* are drawn from center to center of the outer tuyeres. Thus far, the lines of division form sections of two general characters, only one of which—the triangle—possesses the characteristics necessary, the remaining forms being such that a brick corresponding thereto would have overhanging surfaces, whichever side it was placed upon. To obviate this difficulty the quadrilaterals are divided by sectional lines *f f*, which gives a series of ten bricks, each having a broad face or side, upon which the brick may be laid to dry when turned from the mold without danger of its spreading, sagging, or becoming distorted. A series of division-lines, *g g*, drawn from the centers of the tuyeres of the outer circle to the periphery, indicate the forms which may be given to the outer row of fire-bricks when used; but this latter series of bricks may be dispensed with, and plastic ganister rammed in the mold when forming a converter-bottom. These latter bricks will, when made, require a special or curved surface upon which to be placed while drying.

From fire-clay, ganister, or like suitable material, I mold or form bricks for converter-bottoms, corresponding in end section to the diagrams shown in Figs. 1, 2, and 4, and in general form to the bricks illustrated in Figs. 3 and 5—that is to say, with a series of grooves or concavities, $i$, corresponding to a portion of the tuyere-opening, and a flat or broad face, $k$, upon which the brick may rest while drying. In the triangular bricks the grooves $i$ form so small a portion of the circle as to be virtually vertical when the brick rests upon its broad face $k$, or overhang so slightly as (owing to the recession of the remaining faces) to obviate any tendency of the mass settling or sagging.

As before stated, bricks of the shape shown will not sag and become distorted in drying, and, consequently, when arranged in a converter-bottom, will fit the tuyeres and fill the space so accurately as to preclude the necessity of ramming in plastic ganister to fill up space, grouting alone being sufficient.

In addition to the advantages above specified as pertaining to my brick, and converter-bottoms formed therefrom, may be enumerated the greater rapidity with which the bricks may be formed, and the greater protection from cutting or wearing afforded the tuyeres.

I am aware that a sectional drain-tile having a concave surface on one side, bounded by locking-grooves, has been heretofore devised, and do not herein claim such subject-matter.

Having thus described my invention, what I claim, and desire to secure by Letters Patent, is—

A brick for forming converter-bottoms, having a series of concave or grooved faces corresponding to portions of a tuyere, and a broad face or side, upon which the brick may rest in drying, substantially as and for the purpose specified.

In testimony whereof I, the said SAMUEL P. HARBISON, have hereunto set my hand.

SAMUEL P. HARBISON.

Witnesses:
JAMES I. KAY,
L. C. FITLER.